May 16, 1933.  F. J. WATTS  1,909,641
ELECTRIC SWITCH AND CASING
Filed Aug. 8, 1930
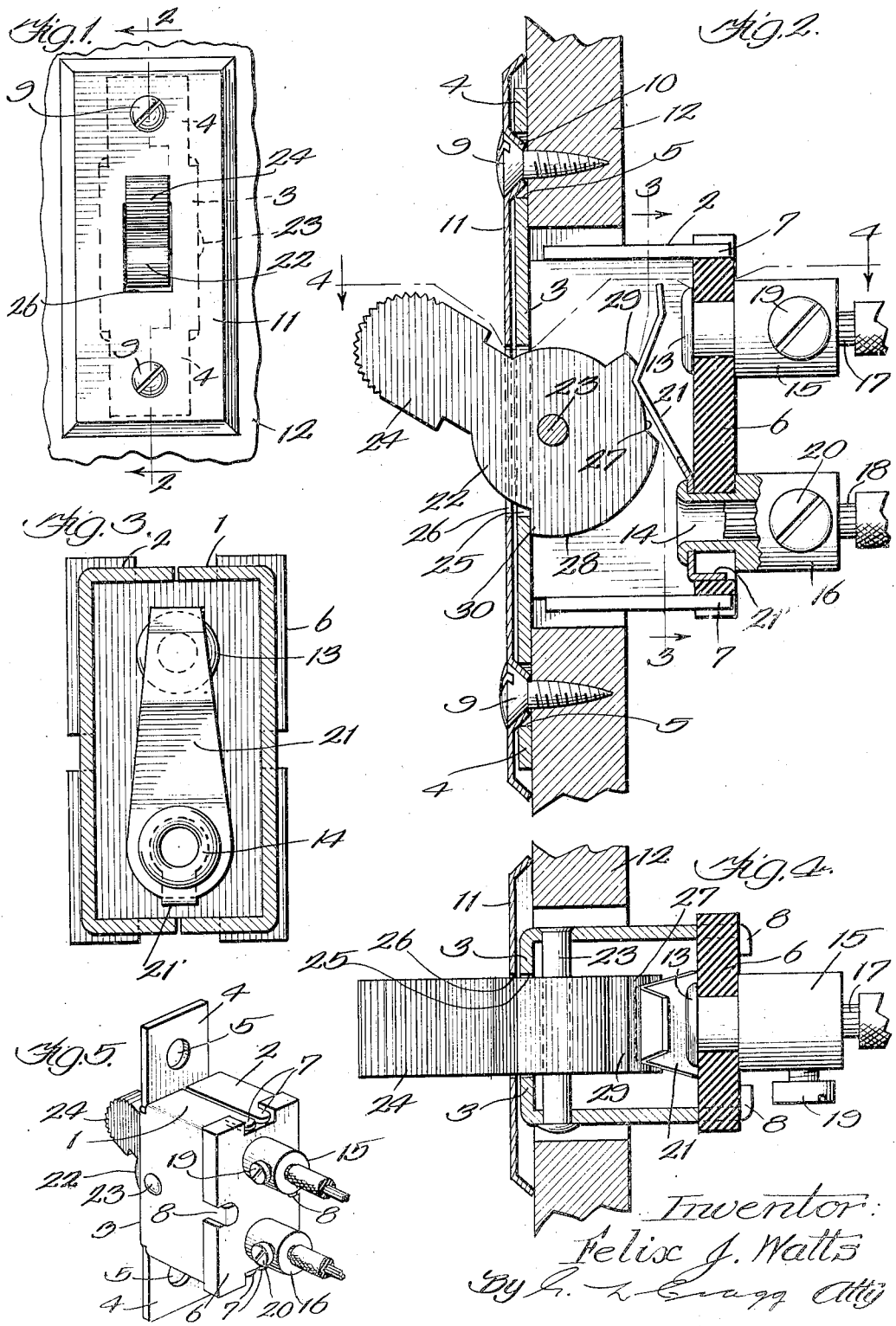
Inventor:
Felix J. Watts Patented May 16, 1933

1,909,641

UNITED STATES PATENT OFFICE

FELIX J. WATTS, OF BRONSON, MICHIGAN, ASSIGNOR TO HARRY A. DOUGLAS, OF BRONSON, MICHIGAN

ELECTRIC SWITCH AND CASING

Application filed August 8, 1930. Serial No. 473,821.

My invention relates to electric switches and casings which are well adapted to house the same. The casing of my invention has a portion in the form of a shell made in two sections and another portion in the form of a casing wall, said casing wall and shell having interengaging formations whereby said wall and casing sections are held in assembly. The contiguous portions of the shell sections are desirably formed with tongues and the casing wall is formed with a notch snugly receiving said tongues. Said shell sections are desirably also elsewhere formed with other tongues that are clinched into engagement with said casing wall. The switch which is housed within the casing is provided with a contact upon the aforesaid casing wall and exposed for engagement within the casing. There is also a switch contact complemental to the aforesaid contact and engageable therewith upon the interior of the casing and a contact actuator accessible for operation upon the exterior of the casing. The two sections of the casing are desirably U-shaped, a wall of one section having a continuation bent across said section and constituting a closure wall for the side of the casing at said continuation. This bent wall continuation is formed with a hole therethrough for the passage of the handle of the contact actuator. The contact actuator is desirably rotatably mounted and a wall of the casing serves as a stop for limiting the actuator in its circuit closing and circuit opening movements.

The invention will be more fully explained in connection with the accompanying drawing in which Fig. 1 is a front elevation of the preferred embodiment of the invention; Fig. 2 is a sectional view on line 2—2 of Fig. 1, on a larger scale; Fig. 3 is a sectional view on line 3—3 of Fig. 2; Fig. 4 is a sectional view on line 4—4 of Fig. 2; and Fig. 5 is a perspective view.

The casing illustrated is formed in two symmetrically related U-shaped sections 1 and 2. One of the casing walls 3 is a bent continuation of at least one of these sections and preferably of both. When the wall 3 is integrally made with both casing sections these three parts of the casing may be formed out of a single stamping that is finally brought to the shape illustrated. Said wall 3 desirably has continuations 4 extending beyond the casing and provided for attachment to a support. These continuations may be provided with apertures 5 for the passage of mounting screws. The remaining wall 6 of the casing is preferably made of insulation, but also supplements the wall 3 in the function of maintaining the two casing sections 1 and 2 in their proper relation. The wall 6 and the contiguous portions of the two casing sections have interengaging formations enabling this wall to take part in performing this function. The interengaging formations illustrated are in the nature of tongues 7 that project from the meeting edges of the casing sections, tongues 8 projecting from the base portions of the casing sections and notches in the wall 6 that snugly receive said tongues. The wall 6 rests against the contiguous edges of the casing sections 1 and 2 and is held in such engagement by the clinching of the tongues 8. The tongues 7 need not be clinched, these tongues being provided to be engaged by the sides of the notches in the wall 6 that receive them to limit the spreading action of the two casing sections and thereby hold them in predetermined spaced apart relation. The mounting screws 9 illustrated have tapering heads and preferably have clamping engagement with the wall continuations 4 through the intermediation of conical sockets 10 which are formed upon an escutcheon or finishing plate 11 that covers this wall, these conical sockets being received in said openings and engaging the margins thereof to hold the wall continuations 4 against the selected support 12. The closure wall 6 of the casing is desirably made of insulation when it is to serve as a carrier for contacts of the switch. One of these contacts 13 and a part 14 of the other contact structure is illustrated as being in the nature of flanges upon the reduced ends of metallic sleeves 15 and 16 respectively, the wall 6 being gripped between these flanges and the larger portions of said sleeves as a result of the riveting operation that forms the flanges. Terminal portions of circuit wires 17 and 18 pass into the bores of said sleeves and are held in mechanical and electrical assembly therewith by means of binding screws 19 and 20. The contact to which the flange 14 pertains is desirably provided upon a leaf spring 21 having one end apertured and receiving the reduced end of the corresponding sleeve 16, this apertured end of the leaf spring being clamped between the flange 14 and the wall 6. The leaf spring is provided with an angular tail 21' which enters a recess in the wall 6 to prevent this spring from turning upon the sleeve 16. Said leaf spring is so tensioned that its unmounted end, which constitutes a contact complemental to the contact 13 is spaced apart from this contact into circuit opening position unless the spring is pressed, against the force of its own resilience, into engagement with this contact.

The contact actuator illustrated is in the form of an insulating body 22 which is mounted to turn upon a shaft 23 that is riveted into the base wall of the U-shaped casing sections 1 and 2. This actuator has a handle 24 which extends through an opening 25 that is formed in the wall portion 3 and also through an opening 26 that is formed in the escutcheon plate 11 in register with the opening 25. The portion of the actuator 22 that is within the casing is of cam formation having two dwells 27 and 28 that are arcuate and coaxial with the shaft 23. The leaf spring 21 is kinked, as illustrated, the crown of the kink being engageable with said dwells. The dwell 27 is of shorter radius than the dwell 28 and permits the spring 21, of its own resilience, to separate from the contact 13. The dwell 28 is of sufficiently larger radius to force the spring 21 against the contact 13 when this dwell engages the crown of the aforesaid kink. The contact actuator is confined to a fixed range of rotation by the shoulders 29 and 30 between which the cam dwells are disposed. The shoulder 29 being engageable with the casing wall 3 acting as a stop when the switch is closed and the shoulder 30 being engageable with this casing when the switch is open.

Changes may be made without departing from the invention.

Having thus described my invention I claim:

In an electric switch, the combination with a metallic casing; of an insulating closure therefor; spaced apart contacts carried by the closure, said contacts embodying flanges of metallic sleeves passing through said closure; a leaf spring clamped between one of said flanges and the closure; a recess in the closure; an angular tail on the leaf spring entering the recess, the other end of the spring being adjacent to but normally spaced from the other contact; a kink in the spring directed away from the closure; a rotatable actuator of insulating material mounted upon and within the casing, said actuator having surfaces engageable with the kink of the spring, said surfaces being spaced at unequal distances from the axis of rotation of the actuator; and an integral handle on the actuator extending through a slot in the casing for rotating the actuator.

In witness whereof, I hereunto subscribe my name.

FELIX J. WATTS.